United States Patent [19]
Fukuoka

[11] Patent Number: 5,950,700
[45] Date of Patent: Sep. 14, 1999

[54] PNEUMATIC TIRE AND VULCANIZATION MOLD THEREFOR

[75] Inventor: Toru Fukuoka, Kodaira, Japan

[73] Assignee: Bridgestone Corporation, Tokyo, Japan

[21] Appl. No.: 08/926,436

[22] Filed: Sep. 10, 1997

[30] Foreign Application Priority Data

Sep. 11, 1996 [JP] Japan ................................. 8-262417

[51] Int. Cl.$^6$ ............................ B29C 33/42; B60C 1/00; B60C 11/12
[52] U.S. Cl. .............................. 152/209.7; 152/209.23; 152/902; 152/DIG. 3; 425/28.1; 425/35
[58] Field of Search .................... 152/209 R, 209 D, 152/DIG. 3, 209.7, 209.23, 902; 425/28.1, 35, 46

[56] References Cited

U.S. PATENT DOCUMENTS

| | | | |
|---|---|---|---|
| 2,779,060 | 1/1957 | Knox ................................. | 152/DIG. 3 |
| 4,031,938 | 6/1977 | Verdier .............................. | 152/209 R |
| 4,566,514 | 1/1986 | Mauk et al. ....................... | 152/209 R |
| 4,994,126 | 2/1991 | Lagnier ............................. | 152/209 R |
| 5,095,963 | 3/1992 | Maitre ............................... | 152/209 R |
| 5,176,765 | 1/1993 | Yamaguchi et al. .............. | 152/DIG. 3 |
| 5,234,326 | 8/1993 | Galli et al. ........................ | 425/46 |
| 5,316,063 | 5/1994 | Lagnier ............................. | 152/209 R |
| 5,643,374 | 7/1997 | Matsumoto ....................... | 152/209 R |
| 5,679,186 | 10/1997 | Tagashira et al. ................. | 152/209 R |

Primary Examiner—Steven D. Maki
Attorney, Agent, or Firm—Sughrue, Mion, Zinn, Macpeak & Seas, PLLC

[57] ABSTRACT

A pneumatic tire comprises sipes in each land portion defined by wide-width grooves in a tread portion, in which a sipe corresponding to at least a part of these sipes comprises a pair of main portions slightly shifting to each other in the axial direction and a link portion connecting opposed end portions of these main portions to each other, and the pair of the main portions are inclined in opposite directions with respect to a radial direction so as to make a mutual distance L between the main portions large.

10 Claims, 6 Drawing Sheets

FIG_1
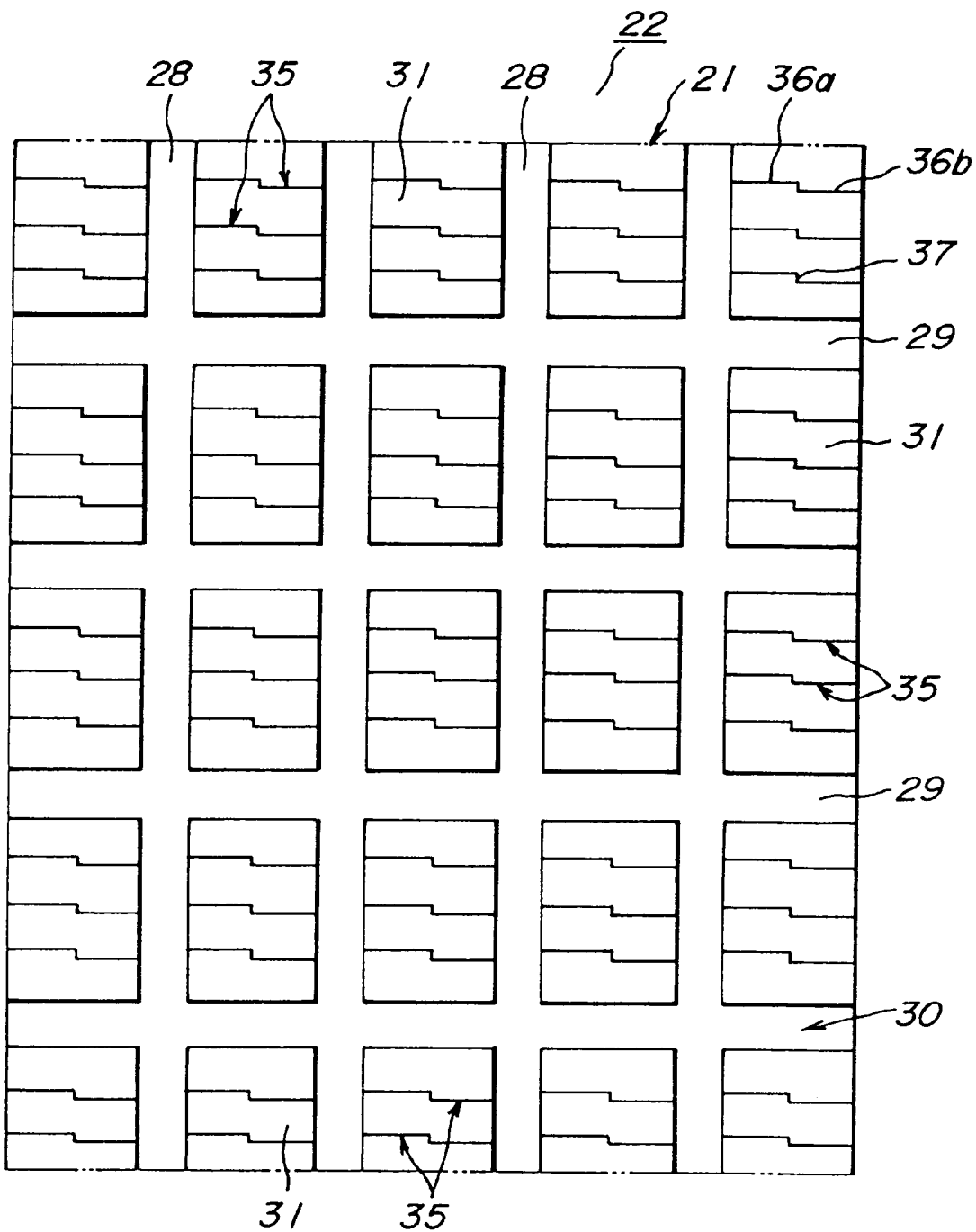

FIG_2
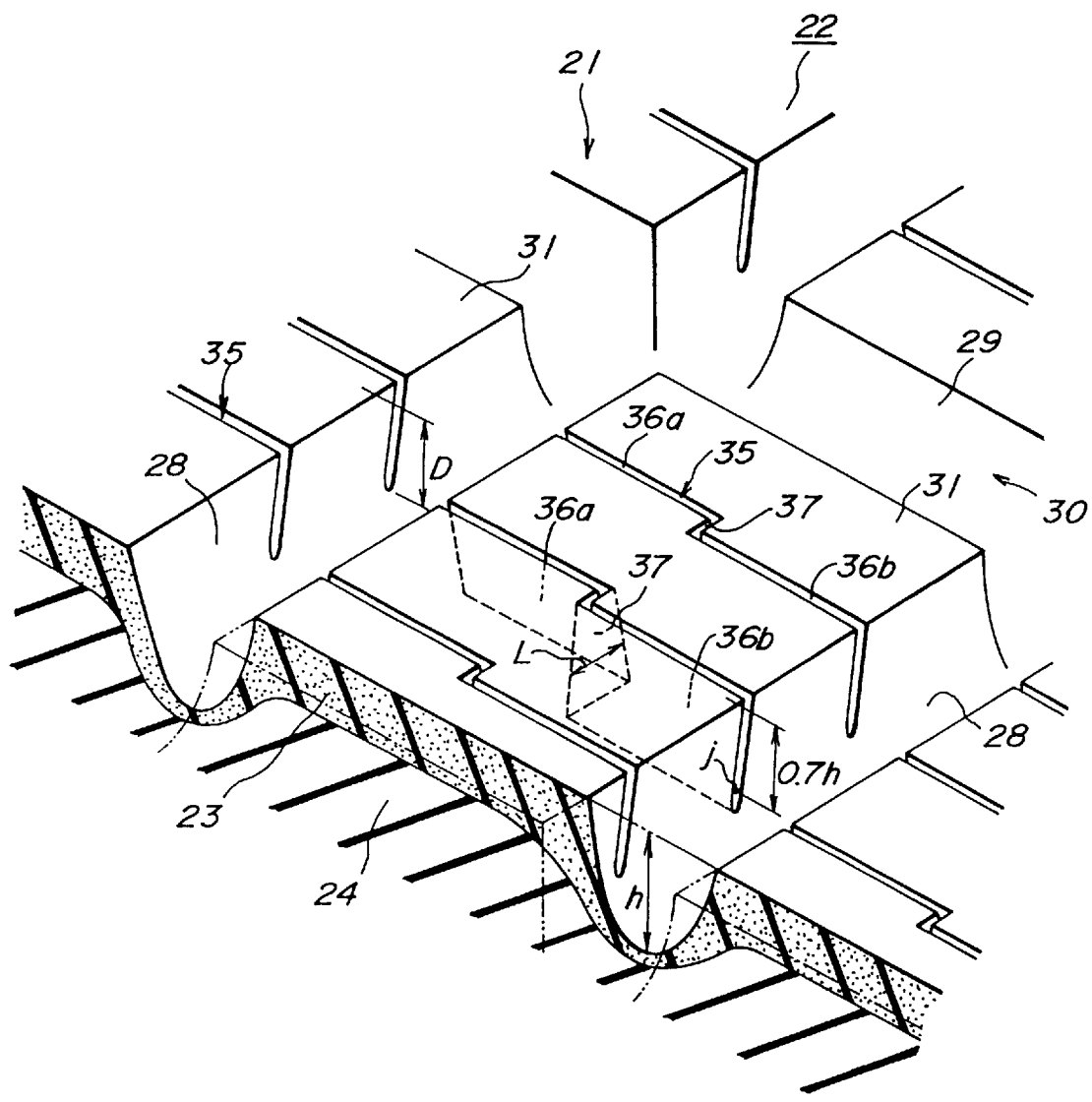

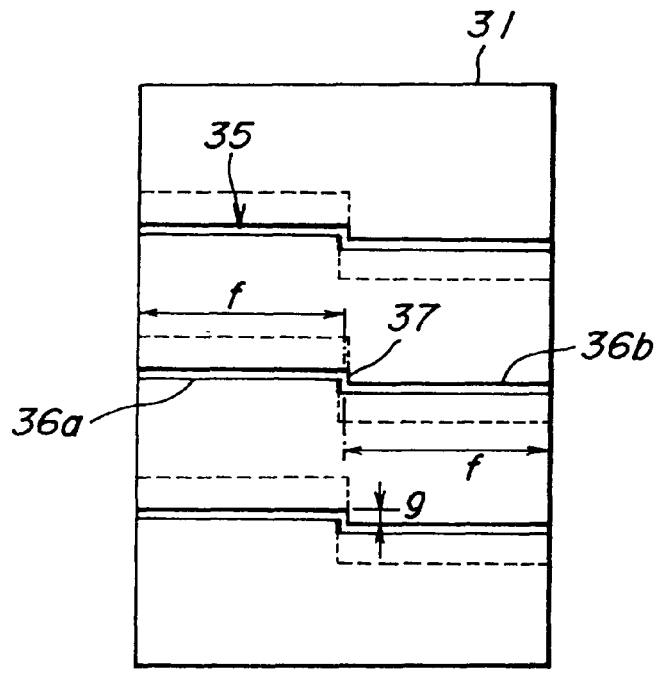
FIG_3
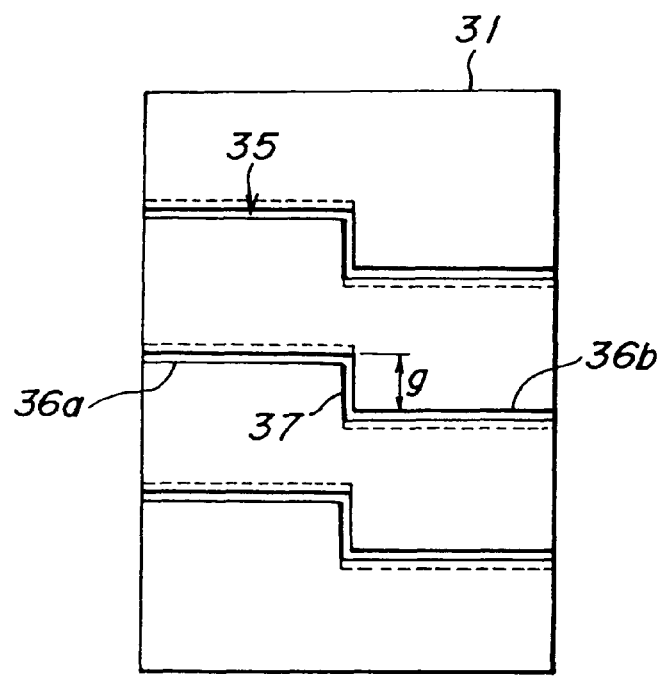
FIG_4

FIG_5
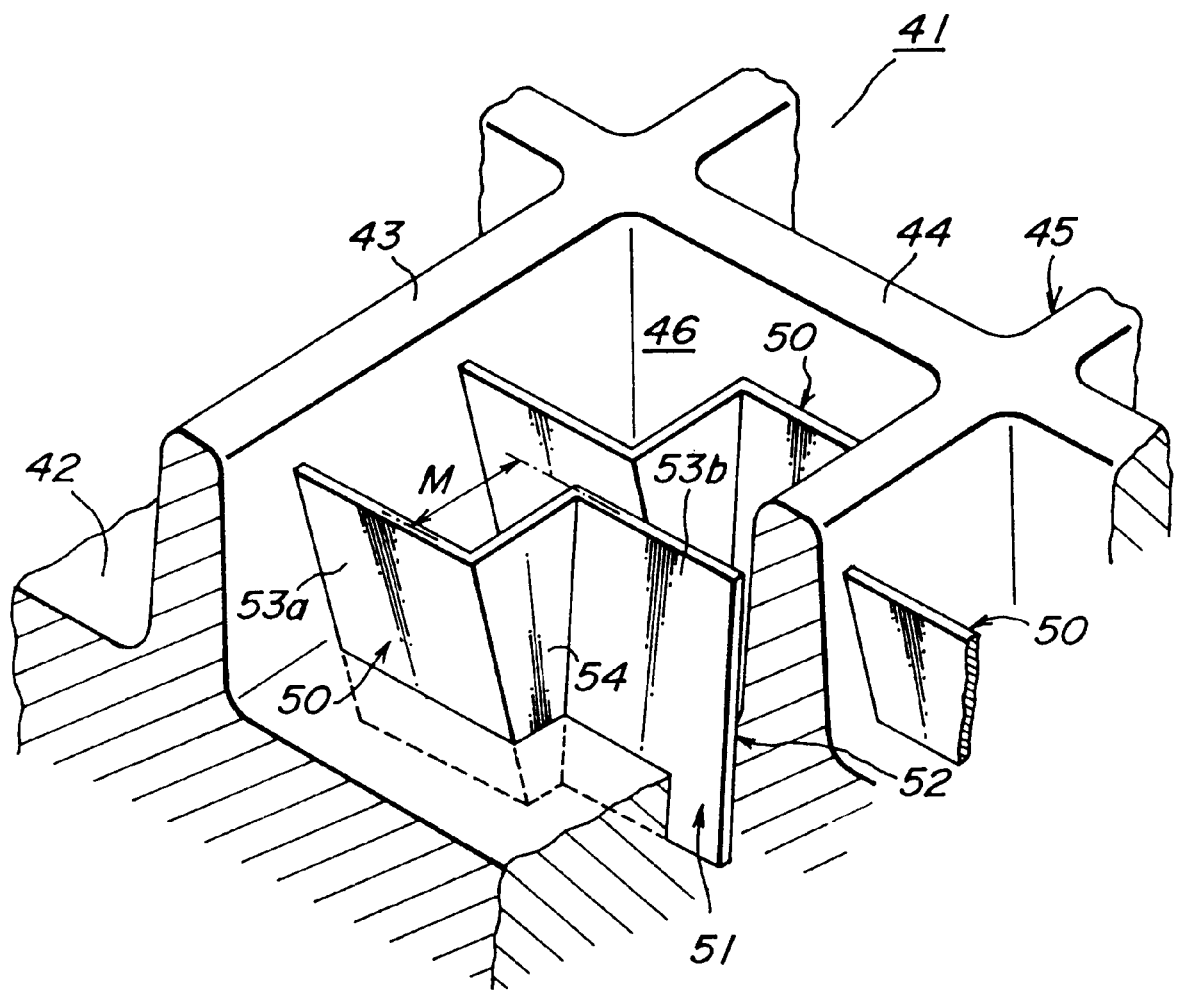

FIG_6
PRIOR ART
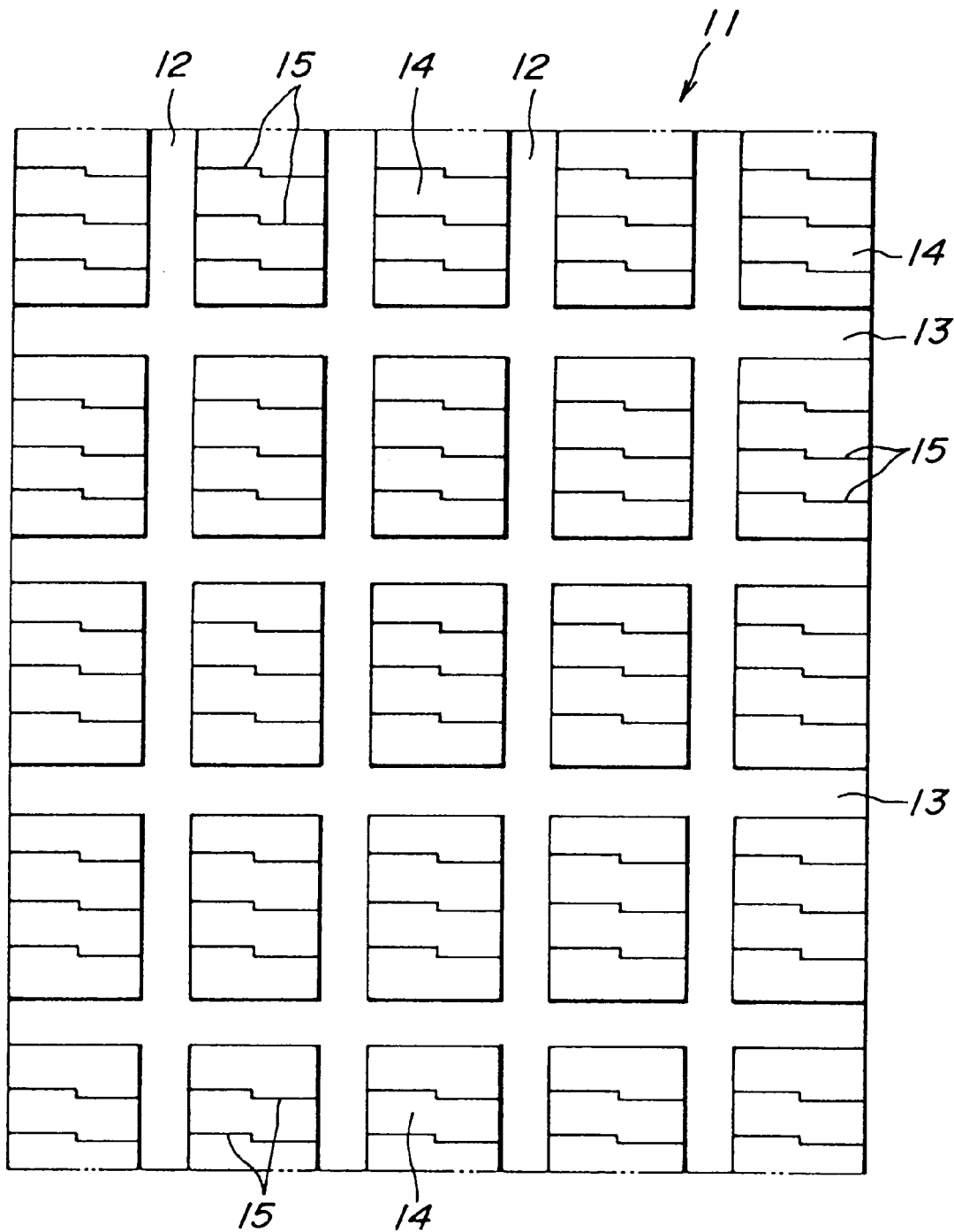

FIG_7
PRIOR ART
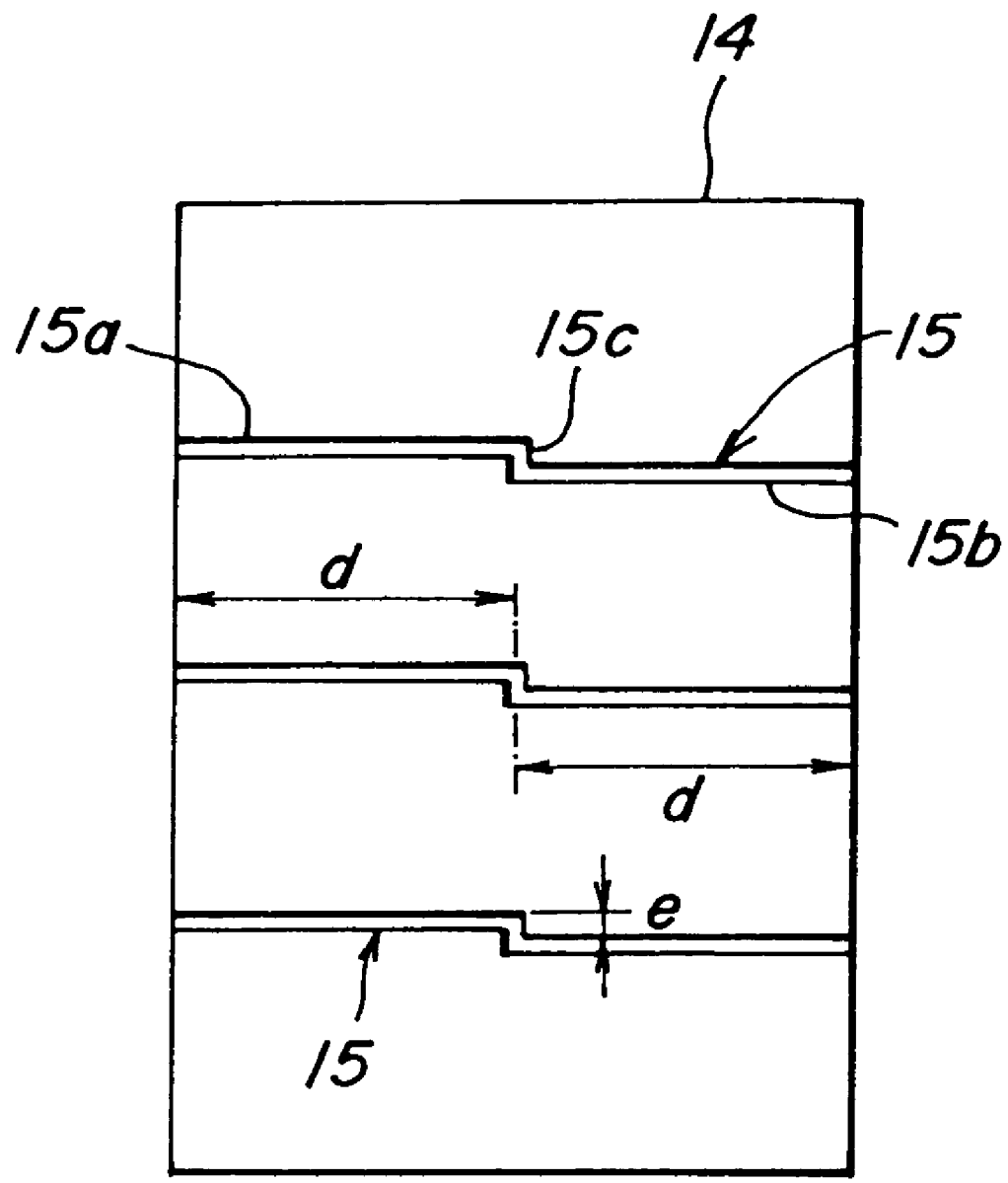

PNEUMATIC TIRE AND VULCANIZATION MOLD THEREFOR

BACKGROUND OF THE INVENTION

1. Field of the Invention

This invention relates to a pneumatic tire comprising sipes in a tread portion and a vulcanization mold for use in the production of such a pneumatic tire.

2. Description of Related Art

Heretofore, there has been known a pneumatic tire having a tread pattern as shown in FIGS. 6 and 7. A plurality of land portions, blocks 14 in the illustrated embodiment are defined in a tread portion 11 by a plurality of wide-width grooves, such as main grooves 12 extending in a circumferential direction of the tire and lateral grooves 13 crossing with the main grooves 12. A plurality of narrow-width sipes 15 extend substantially in an axial direction of the tire and are formed in each of the blocks 14. In this case, all of these main grooves 12, lateral grooves 13 and sipes 15 extend in a radial direction of the tire, so that even if the tread portion 11 is worn in the running of the tire, the plane shape of each of the main groove, lateral groove 13, block 14 and sipe 15 is substantially unchangeable.

In the conventional pneumatic tire, however, there are problems that as the wearing of the tread portion 11 progresses, the groove depth of each of the main groove 12, lateral groove 13 and sipe 15 is gradually made shallow to degrade the drainage property and also the height of the block 14 is lowered and the rigidity of the block in front and rear directions and lateral direction 3 is gradually increased to degrade the steering stability on wet road, the braking property on wet road and the ride comfort against vibrations on dry road.

SUMMARY OF THE INVENTION

It is, therefore, an object of the invention to provide a pneumatic tire capable of effectively controlling the degradation of tire performance accompanied with the progress of the wearing in the tread portion and a vulcanization mold usable for the production of such a pneumatic tire.

According to a first aspect of the invention, there is the provision of a pneumatic tire having a tread portion divided by a plurality of wide-width grooves into a plurality of land portions and provided on each of land portions with a plurality of sipes, in which a sipe corresponding to at least a part of these sipes comprises a pair of main portions extending substantially in an axial direction at a state of shifting these main portions to each other in the axial direction and a link portion connecting opposed end portions of these main portions to each other and extending substantially in a circumferential direction, and the pair of the main portions are inclined in opposite directions with respect to a radial direction so as to make a mutual distance L between the main portions large as the depth of the main portion becomes deep.

It is considered that even if such a pneumatic tire is run, as the wearing of the tread portion progresses, the groove depth of the width-wide main groove is gradually made shallow to degrade the drainage property and also the height of the land portion is lowered and the rigidity of the block in front and rear directions and lateral direction is gradually increased to degrade the steering stability on wet road, the braking property on wet road and the ride comfort against vibrations on dry road. In this pneumatic tire, however, the pair of the main portions constituting the sipe are inclined in opposite directions with respect to the radial direction so as to make the mutual distance L between the main portions large as the depth of the main portion becomes deep and also the opposed end portions of the main portions are connected to each other through the link portion extending substantially in the circumferential direction. As a result the opening ends of the main portions are separated away from each other in the circumferential direction accompanied with the advance of the wearing of the tread portion to gradually prolong the length of the opening end of the link portion connecting the main portions to each other or the total length of the opening ends of the sipe, whereby the scratching effect and drainage (water removal) property of the sipe are improved and the gripping force is generated based on the easiness of the movement through the reduction of surface area of the land portion to thereby effectively control the degradation of the steering stability on wet road and the braking property on wet road. Furthermore, when the total length of the opening end of the sipe is gradually prolonged with the advance of the wearing of the tread portion as mentioned above, the rigidity of the land portion in front and rear directions and lateral direction becomes gradually small. This offsets the increase of the rigidity in the front and rear directions and the lateral direction due to the decrease of the land portion height as previously mentioned to effectively control the degradation of the ride comfort against vibrations on dry road. Furthermore, when the main portions of the sipe are inclined in opposite direction with respect to the radial direction to make the mutual distance large in accordance with the degree of the sipe depth as mentioned above, rubber between adjacent sipes in the circumferential direction is large in the moment of inertia of the section as compared with the case of extending the sipe in the radial direction. The rigidity in the front and rear directions and the lateral direction is increased to a certain extent irrespective of the wearing degree, and also the ground contact pressure of the land portion is made uniform to improve the ground contacting property of the tread portion. As a result the steering stability on dry road, steering stability on wet road and braking property on wet road of a new tire are improved and further snow-ice performances (steering stability on snow, braking property on ice) are improved over a full period of wearing and the wear resistance is improved.

According to a second aspect of the invention, there is the provision of a vulcanization mold for the production of a pneumatic tire comprising frame segments forming wide-width grooves in a tread portion of the tire, a recess defined by these frame segments for forming a land portion in the tread portion, and a plurality of blades disposed in the recess and forming sipes in the land portion. A blade corresponding to at least a part of these blades comprises a pair of main segments extending substantially in an axial direction at a state of shifting these main segments to each other in the axial direction and a link segment connecting opposed end portions of these main segments to each other and extending substantially in a circumferential direction. The pair of the main segments are inclined in opposite directions with respect to a radial direction so as to make a mutual distance M between the main segments large as the main segments protrude upward from the bottom of the recess.

By using such a mold sipes can accurately and easily be formed in the tread portion.

BRIEF DESCRIPTION OF THE DRAWINGS

The invention will be described with reference to the accompanying drawings, wherein:

FIG. 1 is a plan view of an embodiment of the tread pattern used in the pneumatic tire according to the invention;

FIG. 2 is a perspective view partly shown in section of the tread pattern of FIG. 1;

FIG. 3 is a plan view of a block in the tread pattern shown in FIG. 1;

FIG. 4 is a plan view of a block when this block is worn to a certain extent;

FIG. 5 is a perspective view partly shown in section of an embodiment of the vulcanization mold according to the invention;

FIG. 6 is a plan view of a tread pattern used in the conventional pneumatic tire; and FIG. 7 is a plan view of a block in the tread pattern of the conventional pneumatic tire.

DESCRIPTION OF PREFERRED EMBODIMENTS

In FIGS. 1, 2 and 3, numeral 21 is a tread portion of a pneumatic tire 22 having excellent snow-ice performance. The tread portion 21 is comprised of an outer rubber layer 23 located outward in the radial direction and contacting with a road surface and an inner rubber layer 24 located inward in the radial direction. The outer rubber layer 23 is made from a foamed rubber or rubber having many closed cells therein, while the inner rubber layer 24 is made from usual rubber (non-foamed rubber) having a Shore A hardness higher than that of the outer rubber layer. Moreover, a volume ratio of the outer rubber layer 23 to the whole of the tread rubber is necessary to be not less than 10% for improving the snow-ice performance.

In the outer surface of the tread portion 21 are formed a plurality of main grooves 28, four main grooves 28 in the illustrated embodiment extending in the circumferential direction and arranged at given intervals in an axial direction and lateral grooves 29 crossing at right angles with the main grooves 28 and extending in the axial direction and arranged at given intervals in the circumferential direction, in which these main grooves 28 and lateral grooves 29 constitute plural wide-width grooves 30 as a whole. As a result, a plurality of rectangular blocks 31 as land portions are defined by these wide-width grooves 30 in the tread portion 21.

In an outer surface of each of at least a part of these blocks 31 or all blocks 31 in the illustrated embodiment are formed one or more narrow-width sipes 35, three sipes 35 in the illustrated embodiment, whereby a plurality of the sipes 35 are formed in the block 31 as the land portion. The sipe 35 extends substantially in an axial direction of the pneumatic tire 22 and both ends thereof are opened to the main grooves 28. Further, the sipe 35 has the same depth D at any position and is somewhat shallower than a groove depth h of the main groove 28 and the lateral groove 29. In the invention, a sipe 35 corresponding to at least a part of these sipes 35 is comprised of a pair of main portions 36a, 36b extending substantially in the axial direction at a state of shifting these main portions 36a, 36b to each other in the axial direction and a link portion 37 connecting opposed end portions of these main portions 36a, 36b, opposed inner end portions thereof in the illustrated embodiment to each other and extending substantially in the circumferential direction. This shows a step-like plan shape. Furthermore, the pair of the main portions 36a, 36b are inclined in opposite directions with respect to the radial direction to make the mutual distance L between the main portions 36a, 36b large as the depth of the main portion becomes deep. That is, when the main portion 36a is inclined at one side with respect to the circumferential direction inward in the radial direction, the main portion 36b is inclined at the other side with respect to the circumferential direction inward in the radial direction. Hence the link portion 37 has a trapezoidal shape widening in width toward the bottom.

As the tread portion 21 of the pneumatic tire 22 in the illustrated embodiment is gradually worn during the running of the tire, since the main portions 36a, 36b of the sipe 35 are inclined at an enlarged state in the depth direction thereof and the opposed end portions of the main portions 36a, 36b are connected to each other through the link portion 37 extending substantially in the circumferential direction, the opening ends of the main portions 36a, 36b are separated away from each other in the circumferential direction to gradually prolong the length of the opening end of the link portion 37 connecting the main portions 36a, 36b as shown in FIG. 4. In other words, the total length of the opening end (edge length) of the sipe 35 is gradually prolonged. As a result, the drainage (water removal) property is improved and the block rigidity is appropriated to improve the steering stability on wet road and effectively control the degradation of the braking property on wet road. On the other hand, the rigidity of the block 31 in front and rear directions and lateral direction is gradually decreased accompanied with the prolonging of the total length of the opening end of the sipe 35. This offsets the increase of the rigidity in front and rear directions and lateral direction due to the decrease of the block height to effectively control the degradation of the ride comfort against vibrations on dry road.

Furthermore, the main portions 36a, 36b of the sipe 35 are inclined in opposite directions at the enlarged state toward the depth direction thereof, so that rubber between adjacent two sipes 35 in the circumferential direction becomes large in the moment of inertia of the section as compared with the conventional case of extending the sipe 15 in the radial direction (see FIG. 7). Hence the rigidity of the block 31 in front and rear directions and lateral direction is increased to a certain extent irrespective of the wearing degree, and also the ground contact pressure of the land portion is uniformized to improve the ground contacting property of the tread portion. Consequently, the steering stability on dry road, steering stability on wet road and braking property on wet road of a new tire are improved and further snow-ice performances (steering stability on snow, braking property on ice) are improved over a full period of wearing and also the wear resistance is improved.

FIG. 5 illustrates a vulcanization mold 41 for the production of the pneumatic tire 22. The mold 41 has a tread forming face 42 for the formation of the tread portion 21 therein. In the tread forming face 42 are disposed a plurality of main frame segments 43, four main frame segments 43 in the illustrated embodiment protruding inward from the face 42 and extending substantially in the circumferential direction and arranged at given intervals in the axial direction and a plurality of lateral frame segments 44 crossing at right angles with the main frame segments 43 and extending in the axial direction and arranged at given intervals in the circumferential direction. These main frame segments 43 and lateral frame segments 44 form plural frame segments 45 as a whole, in which the main frame segments 43 form main grooves 28 in the tread portion 21 of an uncured tire and the lateral frame segments 44 form lateral grooves 29. Furthermore, the tread forming face 42 is provided with a plurality of recesses 46 defined by these main frame segments 43 and lateral frame segments 44. These recesses 46 form blocks 31 in the tread portion 21 of the uncured tire.

Numeral 50 is a blade for forming the sipe 35 in the outer surface of the block 31. One or more blades 50, 3 blades 50 are disposed in each of the recesses corresponding to at least a part of the recesses 46 or all recesses 46 in the illustrated embodiment, so that a plurality of blades 50 are arranged in the recesses 46 as a whole. Each of these blades 50 is provided on its outer end portion in the radial direction with an embedded portion 51 extending in the radial direction. The embedded portion 51 or a part of the blade 50 is embedded in the vulcanization mold 41. Numeral 52 a sipe forming portion extending from the embedded portion 51 substantially inward in the radial direction, i.e. the sipe forming portion 52 protrudes inward from the bottom of the recess 46. Further, the sipe forming portion 52 extends substantially in the axial direction and contacts at both ends with the main frame segments 43, in which the height of the sipe forming portion is the same at any position and is somewhat lower than the height of the main frame segment 43 and lateral frame segment 44. In the invention, a sipe forming portion of a blade 50 corresponding to at least a part of these blades 50 or each of all blades 50 in the illustrated embodiment comprises a pair of main segments 53a, 53b extending substantially in the axial direction at a state of shifting these main segments 53a, 53b to each other in the axial direction and a link segment 54 connecting opposed end portions of these main segments 53a, 53b, i.e. opposed inner end portions in the illustrated embodiment to each other and extending substantially in the circumferential direction, and shows a step-like plan shape. Further, the pair of the main segments 53a, 53b are inclined in opposite directions with respect to the radial direction to make the mutual distance M between the main segments 53a, 53b large as the main segments protrude upward from the bottom of the recess. That is, when the main segment 53a is inclined at one side with respect to the circumferential direction inward in the radial direction, the main segment 53b is inclined at the other side with respect to the circumferential direction inward in the radial direction. Hence the link segment 54 has a trapezoidal shape widening the width toward the bottom. In this case, when the inclination angle of the main segment 53a, 53b with respect to the radial direction is too small, the degradation of the tire performances as mentioned above can not effectively be controlled, while when it is too large, it is difficult to take out the blades 50 from the cured tire after vulcanization, so that the inclination angle is preferably within a range of 3–15 degrees.

In case of producing the pneumatic tire 22 by using the vulcanization mold 41, an uncured tire is first placed in the mold 41 and then a vulcanization medium of high temperature and high pressure is charged into an inside of a bladder (not shown) to push the uncured tire onto the tread forming face 42. In this case, the main frame segments 43, lateral frame segments 44 and sipe forming portions 52 of the blades 50 are pushed into the tread portion 21 of the uncured tire, whereby a plurality of main grooves 28 and a plurality of lateral grooves 29 are accurately and easily formed in the outer surface of the tread portion 21 and also and sipes 35 are accurately and easily formed in the outer surfaces of the blocks 31 defined by these main grooves 28 and lateral grooves 29.

In the above embodiment, the tread portion 21 has a two-layer structure comprised of the outer rubber layer 23 made from the foamed rubber and the inner rubber layer 24 made from usual rubber (non-foamed rubber). However, the whole of the tread portion 21 may be made from usual rubber in the invention. Although the land portion is the block 31 in the illustrated embodiment, the land portion may be a rib by omitting the lateral grooves. Further, both ends of the sipe 35 are opened to the main grooves 28 in the above illustrated embodiments, but a sipe, on end of which being terminated on the way of the land portion or a sipe terminating both ends in the land portion may be used in the invention. Also, the link portion 37 connects opposed inner ends of the main portions 36a, 36b to each other in the above illustrated embodiment, but it may connect opposed inner end parts of the main portions located somewhat outward from the inner ends thereof to each other in the invention. Moreover, the main portions 36a, 36b may be bent in a wavy or zigzag form in the invention.

The invention will now be described with respect to the following test example.

TEST EXAMPLE

In this test, there are provided a conventional tire having a tread pattern shown in FIGS. 6 and 7 in which the sipe 15 extends along the radial direction (the opening shape is unchangeable even in the progress of the wearing) and has a length d of main portions 15a, 15b of 12 mm and a length e of a link portion 15c of 2 mm, and a test tire according to the invention having a tread pattern shown in FIGS. 1, 3 and 4 in which the sipe 35 has a length f of main portions 36a, 36b of 12 mm and a length g of link portion 37 of 2 mm in a new tire and 5.5 mm in a point j separated from the surface of the block 31 by 0.7 times a height h of the main groove 28 (10 mm) in the depth direction. Each of these tires has a tire size of 205/65R15. The depth D of each of the sipes 15, 35 is 8 mm. Then, the tire is mounted on a passenger car having a displacement of 2000 cc and thereafter various tests were made with respect to steering stability on dry road, ride comfort against vibrations on dry road, steering stability on wet road, braking property on wet road, steering stability on snow, braking property on ice and wear resistance. The test results are shown in Table 1. Moreover, the term "worn state" in Table 1 means that the block is worn up to a distance corresponding to 70% of the depth of the main groove (i.e. point j).

TABLE 1

| | Conventional tire | | Test tire | |
| --- | --- | --- | --- | --- |
| | new state | worn state | new state | worn state |
| Steering stability on dry road | 5 | +2 | +2 | +4 |
| Ride comfort against vibrations on dry road | 5 | −3 | ±0 | ±0 |
| Steering stability on wet road | 5 | −3 | +2 | ±0 |
| Braking property on wet road | 100 | 80 | 103 | 95 |
| Steering stability on snow | 5 | −5 | +2 | −1 |
| Braking stability on ice | 100 | 70 | 110 | 90 |
| Wear resistance | 100 | | 105 | |

The steering stability on dry road and ride comfort against vibrations on dry road are evaluated by a professional driver's feeling when the passenger car is run on dry road, and the steering stability on wet road is evaluated by a professional driver's feeling when the passenger car is run on wet road prepared by spraying water on a test course, and the braking property on wet road is evaluated by an index representing a running distance when the passenger car running at a speed of 80 km/h on wet road is full-braked.

Further, the steering stability on snow is evaluated by a professional driver's feeling when the passenger car is run on snow covered road, and the braking property on ice is evaluated by an index representing a running distance when the passenger car running at a speed of 20 km/h on frozen road is full-braked, and the wear resistance is evaluated by an index representing an average value of the remaining depth of the wide-width groove measured at 10 places after the passenger car is run over a distance of 40,000 km. Moreover, the steering stability on dry road, ride comfort against vibrations on dry road, steering stability on wet road and steering stability on snow are represented by a relative evaluation of 10 points when the new state of the conventional tire (control) is 5 points, in which ±35 is unchangeable, +2 is slightly good, +4 is good, −1 is slightly bad, −3 is bad and −5 is fairly bad. And also, the braking property on wet road, braking property on ice and wear resistance are represented by an index value on the basis that the conventional tire is 100, in which the larger the index value, the better the property.

The same tests as mentioned above are made with respect to another test tire having the sipe 35 in which the length f of main portions 36a, 36b is 12 mm and the length g of link portion 37 is 1 mm at new tire and 2.8 mm at the point j, and hence the effect is approximately ⅓ of the first test tire.

As mentioned above, according to the invention, the degradation of tire performance accompanied with the advance of the wearing of the tread portion can effectively be controlled.

What is claimed is:

1. A pneumatic tire comprising: a tread portion divided by a plurality of wide-width grooves into a plurality of land portions and provided on each of land portions with a plurality of sipes, a sipe between two of said wide-width grooves corresponding to at least a part of these sipes comprises a pair of main portions extending substantially in an axial direction and being shifted in the circumferential direction relative to each other and a link portion connecting opposed end portions of said main portions to each other and extending substantially in a circumferential direction, and said pair of the main portions being inclined in opposite directions with respect to a radial direction to increase a mutual distance L between the main portions as the depth of the main portion increases along the entire depth of the sipe.

2. A pneumatic tire according to claim 1, wherein each of the main portions is inclined at an angle of 3–15° with respect to the radial direction.

3. A pneumatic tire according to claim 1, wherein other end portions of each of said main portions of the sipe open to said wide-width grooves.

4. A pneumatic tire according to claim 1, wherein said sipes have a constant depth.

5. A pneumatic tire according to claim 4, wherein said constant depth of said sipes is approximately 0.7 h where h is a depth of a wide-width groove.

6. A pneumatic tire according to claim 1, wherein said trend portion comprises a two-layer structure comprising a outer foamed rubber layer and an inner layer comprising a non-foamed rubber layer.

7. A vulcanization mold for the production of a pneumatic tire comprising; frame segments for forming wide-width grooves in a tread portion of the tire, a recess defined by said frame segments for forming a land portion in the tread portion, and a plurality of blades disposed in the recess and for forming sipes in the land portion, in which a blade between two of said frame segments corresponding to at least a part of these blades comprises a pair of main segments extending substantially in an axial direction and being shifted in the circumferential direction relative to each other and a link segment connecting opposed end portions of these main segments to each other and extending substantially in a circumferential direction, and the pair of the main segments are inclined in opposite directions with respect to a radial direction so as to increase a mutual distance M between the main segments as the main segments protrude upward from the bottom of the recess along the entire height of the blade.

8. A vulcanization mold according to claim 7, wherein each of the main segments is inclined at an angle of 3–15° with respect to the radial direction.

9. A vulcanization mold according to claim 7, wherein said main segments of said blade extend in the axial direction to contact said frame segments.

10. A vulcanization mold according to claim 7, wherein said blades have constant radial height.

* * * * *